United States Patent [19]
Allison

[11] Patent Number: 5,148,179
[45] Date of Patent: Sep. 15, 1992

[54] DIFFERENTIAL POSITION DETERMINATION USING SATELLITES

[75] Inventor: Michael T. Allison, Santa Clara, Calif.

[73] Assignee: Trimble Navigation, Sunnyvale, Calif.

[21] Appl. No.: 722,512

[22] Filed: Jun. 27, 1991

[51] Int. Cl.$^5$ .......................... H04B 7/185; G01S 5/02
[52] U.S. Cl. ..................................... 342/357; 364/449
[58] Field of Search ............... 342/457, 357, 352, 356; 364/449

[56] References Cited

U.S. PATENT DOCUMENTS

| | | |
|---|---|---|
| 4,463,357 | 7/1984 | MacDoran . |
| 4,754,283 | 6/1988 | Fowler . |
| 4,797,677 | 1/1989 | MacDoran et al. . |
| 4,812,991 | 3/1989 | Hatch . |
| 4,870,422 | 9/1989 | Counselman . |
| 4,912,475 | 3/1990 | Counselman . |

OTHER PUBLICATIONS

Timo Allison et al, "A Geodetic Survey Receiver With Up To 12 L1 C/A Code Channels and 12 L2 Pseudo-P-Code Channels", presented at Third Internation Technical Meeting of the Satellite Division of the Institute of Navigation, Colorado Springs, Colo., Sep. 1990.

Primary Examiner—Theordore M. Blum
Attorney, Agent, or Firm—John Schipper

[57] ABSTRACT

A method for accurately determining the position of a roving signal receiver positioned on or above the Earth's surface, relative to the position of a reference receiver whose position is known with sufficient accuracy, using ranging information, transmitted at a pair of predetermined carrier signal frequencies and received from each of n satellites ($n \geq 4$). Pseudorange double differences are formed, between each of the two receivers and each of a first satellite and the other three satellites, using pseudorange information obtained from either one of the two signal frequencies. Phase correction information, in the form of estimates of integer lane wavelength ambiguities, is then obtained from the pseudorange double differences and from certain measurable phase differences. This products $n-1$ simultaneous equations that can be solved for the roving receiver position cordinates. The method can be adapted to provide roving receiver position when signals carried by both of the two carrier frequencies are encrypted, where a separate non-encrypted signal is available on one of the two carrier frequencies.

15 Claims, 3 Drawing Sheets

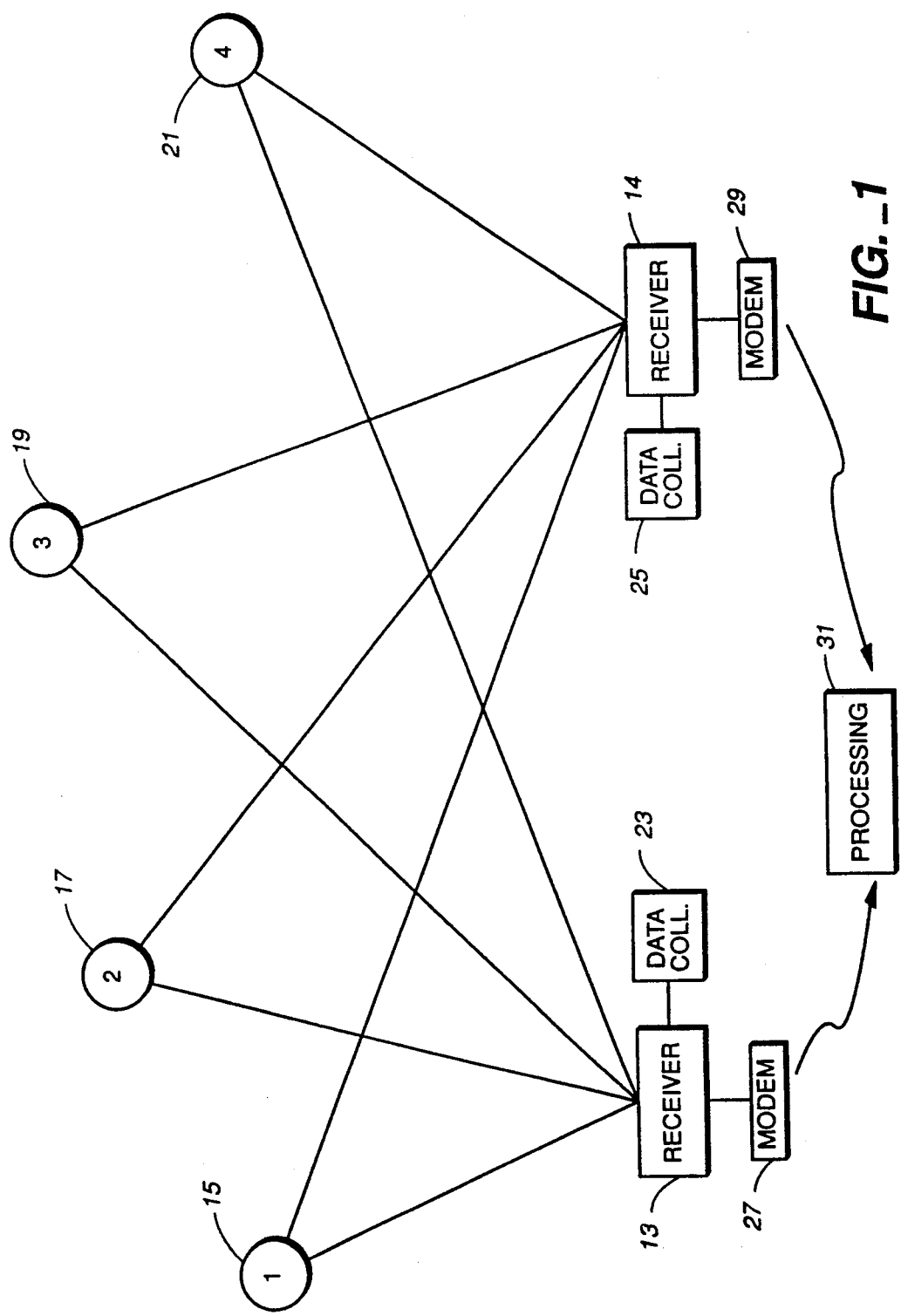
FIG._1

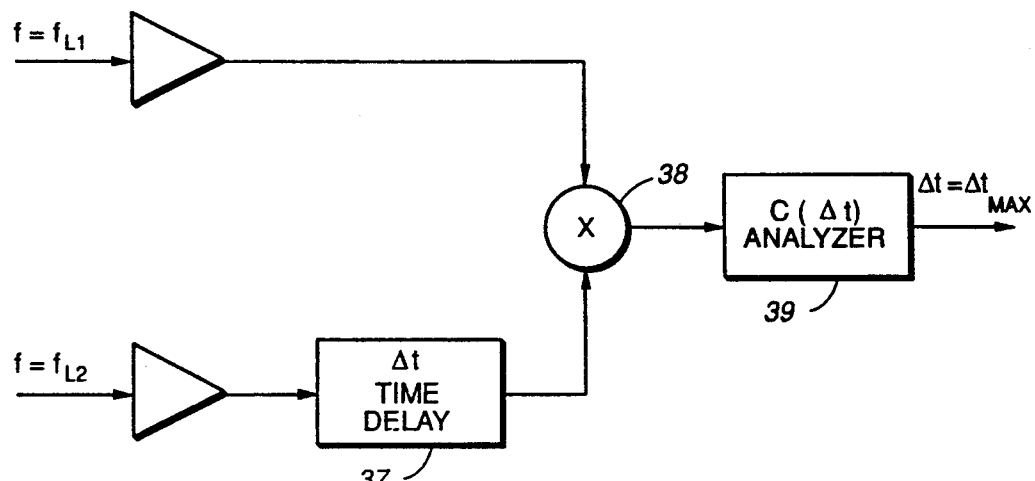
FIG._2A
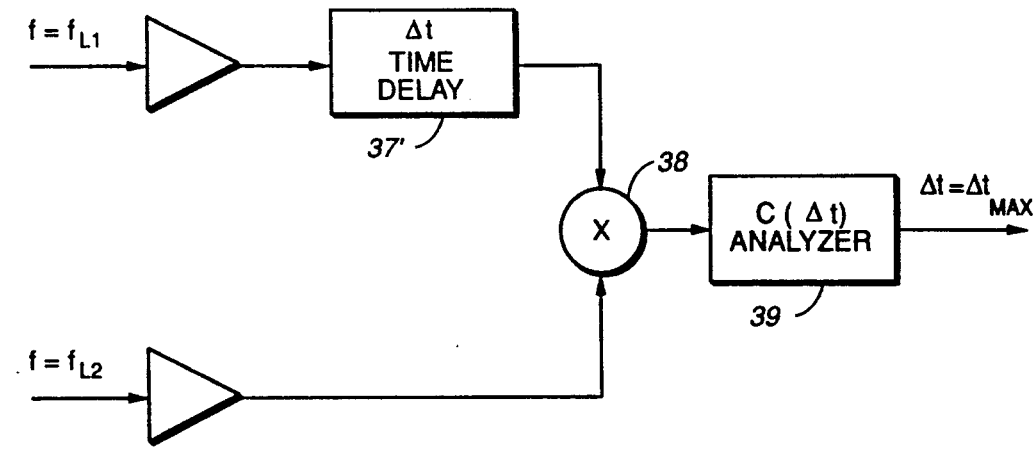
FIG._2B

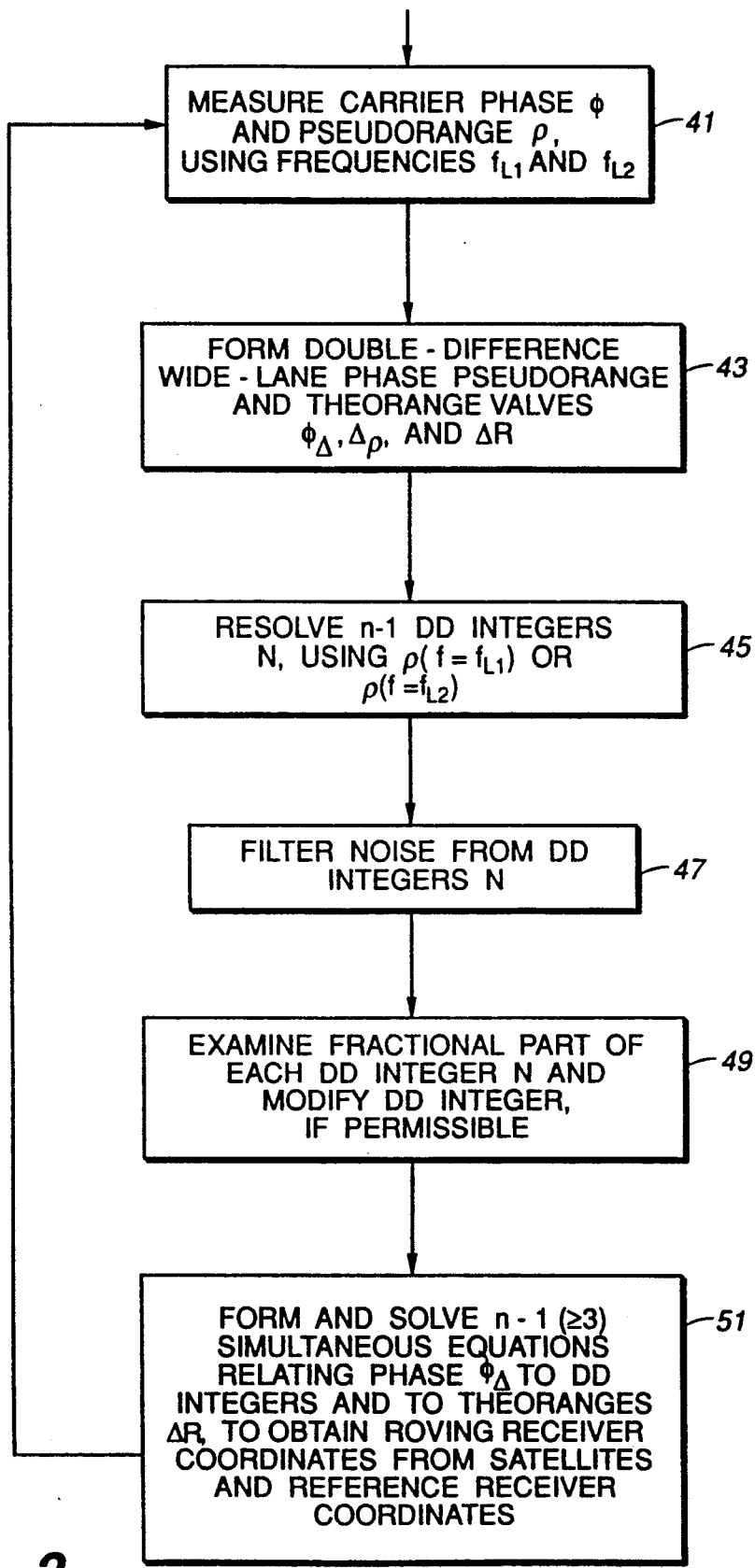
FIG._3

DIFFERENTIAL POSITION DETERMINATION USING SATELLITES

FIELD OF THE INVENTION

This invention relates to determination of position on or above the Earth's surface, using satellite communications for such determination.

BACKGROUND OF THE INVENTION

A Global Positioning System ("GPS") uses transmission of coded radio signals from a plurality of Earth-orbiting satellites. A single passive receiver of such signals is capable of determining receiver absolute position in an Earth-centered, Earth-fixed coordinate reference system utilized by the GPS. A configuration of two or more receivers can be used to accurately determine the relative positions between the receivers or stations. This method, known as differential positioning, is far more accurate than absolute positioning, provided that the distances between these stations are substantially less than the distances from these stations to the satellites, which is the usual case.

In differential positioning, many of the errors in the GPS that compromise the accuracy of absolute position determination are similar in magnitude at stations that are physically close. The effect of these errors on the accuracy of differential position determination is therefore substantially reduced by a process of partial error cancellation.

The GPS satellites transmit spread-spectrum signals on the L1 frequency ($f_{L1}=1575.42$ MHz) and on the L2 frequency ($f_{L2}=1227.6$ MHz). The L1 signal is modulated by two pseudo-random noise (PRN) codes, known as the C/A-code (chip rate of 1.023 MHz) and the P-code (chip rate of 10.23 MHz). The L2 signal is modulated only by the P-code. Most GPS receivers generate replica PRN codes to facilitate coherent demodulation of the received GPS signals. Accepted methods for generating the C/A-code and P-code are available to designers of GPS receivers in the document GPS Interface Control Document ICD-GPS-200, Rockwell International Corporation, Satellite Systems Division, Revision A, 26 Sep. 1984, which is incorporated by reference herein. The operators of the GPS satellites can substitute for the P-code an encrypted version of the P-code, called the Y-code. The Y-code would be transmitted on both the L1 and L2 frequencies.

In addition to transmitting the PRN codes, the GPS satellites also transmit navigational data at 50 Baud. These data are ephemerides and almanac of the satellites and are used to calculate accurate satellite positions in an Earth-centered, Earth-fixed coordinate system. These positions are utilized by absolute and differential positioning methods.

Numerous applications require determination of the relative position between stations. Geodetic survey applications can be subdivided into: (1) applications in which all of the stations receiving the GPS signals are stationary, referred to as static surveying; and (2) applications in which one or more of the stations is moving relative to other stations, referred to as kinematic surveying. The latter class of applications is increasingly popular, because many more relative station positions can be determined in a fixed time of observation of the GPS satellites. Differential positioning applications, such as aerial and marine surveying, are kinematic surveying by definition.

If the stations have a method of inter-station communication, the relative positions between stations can be computed in real-time. Data need not be stored and post-processed after a surveying mission in applications that require real-time relative position, such as precision approach landing of aircraft and piloting of marine vessels.

One or more stations is designated as a reference station, and can be fixed at a known position or can be moving. The positions of the other stations, known as the roving stations, which also may be stationary or moving, are calculated relative to the reference station(s). The approximate absolute positions of the reference stations are required. These positions, if unknown, can be computed using established absolute position determination methods that utilize measurement of PRN code phases.

The highest accuracy obtainable in differential positioning requires measurement and utilization of the received carrier phase of the L1 and L2 signals at precisely known times, derived from clocks within the GPS receivers. Many techniques for processing GPS data for kinematic surveying applications use only these carrier phase measurements in the calculation of differential positions, with measurement of PRN code phases only used to calculate accurate time-marks for the carrier phase measurements.

A major difficulty occurs if only the carrier phase measurements are utilized in the calculation of differential positions. These measurements are ambiguous. The measurement from each satellite includes measurement of a fractional phase $\phi (0°<\phi<360°)$ plus an additional integer number N of whole cycles of phase. This integer number or integer ambiguity, hereafter referred to as a phase integer, cannot be directly measured by a receiver.

For kinematic surveying, a process known as integer initialization can be used to establish the initially unknown phase integers. One approach is to set the receivers at marks whose relative positions are already known. These relative positions are also known as baselines, and are defined by (x,y,z) vector components. Another approach is to allow the receivers to remain static at arbitrary marks for a period of time, to allow static surveying techniques to be used to resolve the phase integers. Another approach is to exchange the antennas between receivers set at arbitrary marks without disturbing the signal reception during the exchange of antennas. Once the phase integers are resolved, differential positioning is possible with the full accuracy obtained by the carrier phase measurements. However, if signal lock cannot be maintained on four satellites with suitable geometry, the initialization procedure must be repeated.

All of the initialization procedures mentioned above require the receivers to remain stationary relative to each other, and some of these procedures are time-consuming. Thus, these methods cannot be used on the moving platforms encountered in aerial and marine kinematic surveying.

In U.S. Pat. No. 4,463,357, MacDoran discloses maximization of the cross-correlation of two identical signals, modulated at different carrier frequencies, arriving at a receiver, to determine the time difference of arrival of the signals. This time difference arises from a difference in phase delay for passage of the two modulated signals through the ionosphere. This technique is used to measure the columnar electron content of the ionosphere.

Fowler, in U.S. Pat. No. 4,754,283, discloses use of a codeless sounding device to monitor wind velocity and wind direction, using a transmitter whose position is known in space, a first receiver whose position on the ground is known and fixed, and a second receiver that is airborne and carried by the locally prevailing wind. Wind direction and magnitude are determined by comparison of Doppler-shifted signals received at the two receivers.

In U.S. Pat. No. 4,797,677, MacDoran et al disclose a method for determining pseudorange of a receiver positioned on the ground from Doppler shift measurements of signals transmitted by two or more satellites and received by a ground-based receiver, whose position is at least partly unknown. A coarse range measurement is first made, and this coarse range is required to be accurate to within one third of a wavelength. A Doppler-derived pseudorange is divided by signal wavelength to produce a phase, measured in wavelength cycles, that includes an integer part and a fractional part that contributes to fractional phase.

Dynamic differential position determination, using carrier phase measurements at both the carrier frequencies $f_{L1}$ and $f_{L2}$, is disclosed by Hatch in U.S. Pat. No. 4,812,991. Hatch determines uncorrected pseudoranges from each of four or more satellites to a reference receiver of known position and to a roving receiver, both on the ground. Hatch also uses L1 and L2 carrier phase differences and filters the L1 and L2 pseudorange information and further processes the filtered pseudorange data to obtain smoothed range data from each satellite to each receiver. Both L1 and L2 pseudoranges are required. Differences of the smoothed range data and theoretical range data are formed for each satellite-reference receiver combination to aid in determining the position of the roving receiver.

Counselman discloses use of Doppler-shift measurements of signals emitted from two or more satellites and received by two or more ground-based receivers in U.S. Pat. No. 4,870,422. Two carrier frequency signals are transmitted by each satellite, and the received signals are divided into upper and lower sideband signals for further processing to determine a vector separating the two ground-based satellites.

Counselman, in U.S. Pat. No. 4,912,475, discloses use of double difference phase biases for determination of orbital information for each of a plurality of satellites, using three or more ground-based receivers whose positions are known and fixed. The ratios of the receiver baseline distances must satisfy special constraints in this method.

A method is required that will permit accurate differential positioning on stationary or moving platforms by resolving the unknown phase integers associated with carrier phase measurements. In addition, the method should not require a time-consuming or complicated special initialization procedure.

SUMMARY OF THE INVENTION

The invention is a method that satisfies these requirements with a minimum addition of hardware (signal reception and processing circuitry) to GPS receivers in which the invention is embodied. The invention provides a method of processing L1 and L2 signals received from GPS satellites at two or more GPS receivers or stations that allows accurate determination of the relative positions of one or more roving receivers and a reference receiver. These relative positions, also known as differential positions, baseline vectors or baselines, are expressed as vector components in an Earth-centered, Earth-fixed coordinate system. As noted above, the stations may be stationary or may be moving relative to one another.

Measurements of received carrier phase at the L1 and L2 frequencies are subtracted to generate a phase measurement known as the wide-lane phase $\phi_\Delta$. The wide-lane phase $\phi_\Delta$ has an associated wavelength $\lambda_\Delta = c/f_\Delta$, also known as a lane width, equal to that of a signal with a frequency given by the difference $f_\Delta = f_{L1} - f_{L2} = c/\lambda_\Delta$ of the L1 and L2 frequencies. In addition, measurements of the L1 pseudorange or of the L2 pseudorange, using the received phase of the corresponding P-code, are required. Measurements of the L2 pseudorange may be replaced by measurements of the L1 pseudorange, using the received phase of the L1 C/A-code, or the received phase of the L1 P-code. Simultaneous measurements of L1 and L2 pseudoranges are not required, which allows a significant reduction in the complexity of the GPS receivers.

If the method using measurements of the L2 pseudorange is chosen, these measurements can be provided by a single sequencing channel capable of tracking the L2 P-code signal. A receiver using such a channel configuration is described in "A Geodetic Survey Receiver with up to 12 L1 C/A-Code Channels, and 12 L2 Pseudo-P-Code Channels", presented by M. T. Allison, D. Farmer, G. Lennen, and K. Martin at the Third International Technical Meeting of the Satellite Division of The Institute of Navigation, Colorado Springs, Colo., September 1990. Alternatively, a receiver can be used that has an independent L2 P-code channel for each of the received satellite signals, or that has an independent L1 P-code channel for each of the received satellite signals, or which has an independent L1 C/A-code channel for each of the received satellite signals.

The phase integers under discussion, also called double-difference wide-lane ("DD") integers, are associated with double-difference wide-lane ("DD") integers, are associated with double difference wide-lane phase measurements that are formed by differencing wide-lane phase measurements between two or more satellites and two or more receivers. This approach eliminates the detrimental effects of receiver clock and satellite clock inaccuracies. Because each of the wide-lane phase measurements is associated with an unknown integer, the double-difference wide-lane phase measurements are associated with unknown DD integers.

The L1 or L2 pseudoranges are used to directly estimate the DD integer ambiguities of the wide-lane phase measurement from four or more satellites. The estimated DD integers would ideally be true integers, but these DD integers usually consist of integer and fractional parts, due to errors in the measurement system. If the estimation of each of the DD integers has an absolute error less than a half wide-lane cycle, the correct phase integers may be found by ignoring the fractional part. If the error in the estimation of the DD integers is unknown, or assumed to be greater than a half wide-lane, the estimated DD integers can be used with a non-zero fractional part, which reduces the differential positioning accuracy.

The DD integers can be characterized as stationary observables. Their values are independent of the motion of the satellites and the receivers. Because of the stationary nature of the DD integers, successive measurements from the satellites can be used to improve the estimate of these integers. Estimates of the DD integers can be recursively filtered. The L1 and L2 carrier phase measurements and the L1 or L2 pseudorange measurements need not be filtered when this method is utilized.

As additional measurements are received by the filter from the receivers at successive measurement times, the quality of the estimates of the DD integers can be monitored by examining the fractional part of these estimates. After a short time, the fractional part can be set equal to zero, at which time the accuracy of the differential position solution will no longer be affected by errors in the DD integer estimations. The method does not require any initial delays or special initialization procedure. The calculations of differential positions can begin as soon as the necessary measurements are made and information is available for calculation of satellite positions.

One source of error in the method is ionospheric refraction. Because the DD integers refer to measurements differenced between two satellites and two receivers, the magnitude of the differential ionospheric phase delay between satellites and stations produces additional errors in the estimation of the DD integers. Combining the wide-lane phases and the L1 or L2 pseudoranges significantly reduces the effect of the differential ionospheric phase delay on estimation of the DD integers, when the delay is expressed in units of wide lane cycles. If the differential L1 ionospheric phase delay between a pair of satellites and a pair of stations, given in units of L1 cycles, has a magnitude $\epsilon_{I,L1}$, the error in the estimate of the DD integer, expressed in units of wide-lane cycles, associated with the double-difference wide-lane phase measurement for this pair of satellites and stations will be approximately equal to $\epsilon_{I,L1}/12$. This reduction assumes that the wide-lane phase measurements are combined with L2 pseudorange measurements.

If the wide-lane phase measurements are combined with L1 pseudorange measurements, the attenuation factor in the denominator is increased to approximately 16. Presence of these attenuation factors is highly desirable.

Once the DD integers are determined, the wide-lane phase measurements, together with the integers, provide $n-1$ unambiguous double-difference measurements using n satellites ($n \geq 4$). These measurements, together with calculations of satellite positions using the satellite ephemerides and the absolute positions of the reference stations (assumed to be known with sufficient accuracy), provide the information required to calculate differential positions. Least squares or Kalman filter techniques are then used to compute the differential positions between the two receivers (the baseline vector). Differential positions are computed that minimize the errors in a set of simultaneous equations which describe the relationship between the measurements, the satellite positions, and the receiver positions.

Differential position determination can be performed in real-time if the receivers can communicate with each other, or in a post-processing fashion using data collected independently at each station in other situations.

If the P-code transmitted on L2 is encrypted into Y-code, the method of processing signals to resolve the wide-lane DD integers can be adapted. One approach is to cross-correlate the L1 and L2 signals to indirectly derive a measurement of L2 pseudorange. Alternatively, only the L1 pseudorange may be used.

Another approach squares the L2 signal. The generation of the wide-lane phase is now achieved by differencing twice the L1 phase with the phase of the squared L2 signal. In this case, L1 pseudorange measurements are used with the C/A-code, because L1 P-code is assumed to be encrypted.

BRIEF DESCRIPTION OF THE DRAWINGS

FIG. 1 is a schematic diagram illustrating a differential positioning system utilizing four or more Earth-orbiting satellites, a reference receiver and a roving receiver according to the invention.

FIGS. 2a and 2b illustrate a method to obtain a parameter $\Delta t_{12}$ used in the invention.

FIG. 3 is a flow chart illustrating determination of roving receiver position.

DESCRIPTION OF BEST MODE OF THE INVENTION

FIG. 1 illustrates the preferred embodiment of the apparatus, which allows accurate determination of the position of one or more receivers (also known as stations) relative to a reference receiver, using radiosignals received from a plurality of $n(\geq 4)$ Earth-orbiting satellites. No constraint is imposed on the movement of the receivers, which may be stationary or may be moving relative to one another. The Global Positioning System ("GPS"), a satellite system that meets the requirements of the invention, will be used to describe the currently preferred embodiment.

In its simplest form, the apparatus utilizes only two GPS receivers 13 and 14, as shown in FIG. 1. One of these receivers 14 is designated as the reference receiver, and is usually stationary or has a known position. However, there is no constraint that the reference receiver 14 be non-moving. The other receiver 13, designated as the roving receiver, is usually in motion relative to the reference receiver 14. However, there is no requirement that the receiver 13 should be moving. The apparatus in which the invention is embodied can be expanded to include multiple reference and roving receivers.

Each of the receivers 13 and 14 can receive L1 and L2 carrier signals from a plurality of GPS satellites. A plurality of n ($\geq 4$) transmitting satellites 15, 17, 19 and 21 are required. Each of the receivers 13 and 14 is capable of making a measurement of the L1 and L2 fractional carrier phase $\phi$ ($0° \leq \phi < 360°$) at precise time marks generated by the receivers. In addition, each of the receivers 13 and 14 is capable of measuring either (i) the L1 pseudorange, which is given by the phase of the L1 C/A-code or L1 P-code PRN signals converted to units of distance, or (ii) the L2 pseudorange, which is given by the phase of the L2 P-code signal converted to units of distance. In the latter case, if the L2 P-code has been encrypted into Y-code, a measurement of the relative phase of the L1 and L2 Y-codes and a measurement of the phase of the L1 C/A-code can be made and an L2 pseudorange measurement can then be constructed, which is equivalent to the L2 pseudorange measurement which can be made when the L2 P-code is not encrypted. In this special case, the L1 C/A-code measurement is only used to obtain an L1 pseudorange measurement and is not used in other embodiments of the invention. One feature of the invention is that only one of the two pseudorange measurements (L1 and L2) is required.

These measurements can be stored in data collection modules 23 and 25, connected to the receivers 13 and 14, respectively, and can be processed at a later time. Alternatively, and of more interest, these measurements may be transmitted via radio modems 27 and 29 (optional) to a signal processing unit 31. FIG. 1 illustrates radio communication between the receivers 13 and 14 and the processing unit 31. However, any form of communication, such as direct electrical connections, can be used. The processing unit 31 may be located at the roving receiver 13, at the reference receiver 14, or at any other location that allows communication with the receivers 13 and 14. If desired, the processing unit 31 may be integrated into either receiver. The invention could be expanded to include multiple data processing units, which may be integrated into one or both of the receivers 13 and 14. The measurements may be taken at any time interval, for example each second.

Initially, a method is described in which only L2 pseudorange measurements are used, together with the L1 and L2 carrier phase measurements. The method in which the L1 pseudorange $\rho L1$ is substituted for the L2 pseudorange $\rho L2$ is very similar, and is described later. The receivers 13 and 14 measure the L1 carrier phase $\beta_{ij;L1}$ and the L2 carrier phase $\beta_{ij;L2}$ (i=15, 17, 19, 21; j=13, 14) for that satellite (i) and receiver (j). From these measurements, the wide-lane phase $\beta_{\Delta ij}$ for satellite i and receiver j, in units of wide-lane cycles, is given by $$\beta_{\Delta ij} = \beta_{ij;L1} - \beta_{ij;L2} (i=15,17,19,21; j=13,14). \quad (1)$$

In each of the receivers 13 and 14, the measurements from three of the four satellites are differenced against the remaining satellite, which is referred to as the base satellite and can be any one of the four satellites. This produces three measurements, called single-difference wide-lane phase measurements, from each receiver 13 and 14. These measurements are then differenced between the two receivers 13 and 14 to yield three double-difference wide-lane phase measurements, each of which is derived from measurements from only two satellites. For brevity, these measurements will hereafter be referred to as simply wide-lane phase measurements. Computing double-difference measurements eliminates the effects of the clocks within the receivers and within the satellites. This simplifies and increases the accuracy of the differential position method.

The wide-lane phase measurements can be used to define a set of three or more simultaneous equations for certain double-difference phase values $\phi_{\Delta i,i';j,j'}$ of the form given by Eq. (2) below, each of which refers to the same instant $t_i$ in time in a sequence of such times:

$$\phi_{\Delta i,i';j,j'} = -\Delta R_{i,i';j,j'}/\lambda_\Delta + N_{i,i';j,j'} - A(1/f_{L1} - 1/f_{L2}) \quad (2)$$

$$\phi_{\Delta i,i';j,j'} = [\beta_{\Delta ij} - \beta_{\Delta i'j}] - [\beta_{\Delta ij'} - \beta_{\Delta i'j'}] \quad (3)$$

Here, the double-difference wide-lane phase variables $\phi_{\Delta i,i';j,j'}$ are determined from the known, measurable wide-lane phases $\beta_{\Delta i,j}$, defined in Eq. (1), where i and i' refer to satellite numbers and j and j' refer to receiver numbers. $\Delta R_{i,i';j,j'}$ is the double-difference theoretical range, defined in Eqs. (4)–(6) below, between the satellites i and i' and the receivers j and j', which can be calculated from a knowledge of the satellite positions, the reference receiver position, and an estimate of the roving receiver position. These are given by computed double-difference ranges from the receivers 13 and 14 to the satellites, as illustrated in FIG. 1, and are determined by the relations $$\Delta R_{15,17;13,14} = (R_{15,13} - R_{17,13}) - (R_{15,14} - R_{17,14}), \quad (4)$$

$$\Delta R_{15,19;13,14} = (R_{15,13} - R_{19,13}) - (R_{15,14} - R_{19,14}), \quad (5)$$

$$\Delta R_{15,21;13,14} = (R_{15,13} - R_{21,13}) - (R_{15,14} - R_{21,14}). \quad (6)$$

Here, $\lambda_\Delta$ is the wide-lane wavelength, given by $c/(f_{L1} - f_{L2})$ (c=speed of light) and $R_{i,j}$ is the theoretical range ("theorange") from satellite vehicle no. i to receiver no. j. Another quantity that will be used is the pseudorange $\rho_{i,j;Lk}$ from a satellite no. i to a receiver no. j is the approximate range, determined from the measured or observed distance $c(t_j - t^i)$ corresponding to issuance of a satellite transmitter signal by satellite no. i at a time $t^i$ and receipt by receiver no. j of that signal at a time $t_j$, using the L1 or L2 carrier signal, using carrier frequency $f = f_{Lk}$. The pseudorange $\rho_{i,j;Lk}$ does not account for the presence of ionospheric time delays or multiple path time delays in propagation of the signal from satellite no. i to receiver no. j or errors in the satellite clocks or receiver clocks.

The numbers $N_{i,i';j,j'}$ are wide-lane DD integers, determined by and corresponding to the phase variables $\phi_{\Delta i,i';j,j'}$ and double-difference pseudorange values $\Delta \rho_{i,i';j,j';Lk}$ defined below, for two satellites numbered i and i' and two receivers numbered j and j'. The term $A(1/f_{L1} - 1/f_{L2})$ is the differential ionospheric wide-lane phase delay, expressed in units of wide-lane cycles, between the satellites and stations used to form $\phi_{\Delta i,i';j,j'}$, in which the parameter A depends upon the Total Electron Count ("TEC") of the ionosphere. The parameter A may vary with time in some situations. Typically, A is small and is unknown, in which event the term on the right involving A in Eq. (2) can be considered as an error term, whose existence affects the accuracy of determination of position of the roving receiver 13.

Double difference L2 pseudorange measurements are formed, by differencing measurements between two satellites and two receivers, viz.

$$\Delta \rho_{i,i';j,j';L2} = [\rho_{i,j;L2} - \rho_{i',j;L2}] - [\rho_{i,j';L2} - \rho_{i',j';L2}], \quad (7)$$

and will be referred to simply as L2 pseudorange measurements. Each measurement of $\Delta \rho_{i,i';j,j';L2}$ for satellites no. i,i' corresponds to a measurement of $\phi_{\Delta i,i';j,j'}$ together with the DD integer $N_{i,i';j,j'}$, and is derived using the same pair of satellites and two receivers numbered j and j'. The DD integers are given by the relations $$N_{i,i';j,j'} = \Delta \rho_{i,i';j,j';L2}/\lambda_\Delta + \phi_{\Delta i,i';j,j'}. \quad (8)$$

Using this approach to estimate the DD integers results in an error in the estimation, denoted $\epsilon_{I;i,i';j,j'}$, expressed in units of wide-lane cycles, caused by differential ionospheric phase delay between the satellites and receivers used to form $\phi_{\Delta i,i';j,j'}$. This error cannot be easily avoided, because the value of the constant A is usually unknown. For convenience of notation, the subscripts i,i';j,j' on the differential ionospheric delay error term $\epsilon_{I;i,i';j,j'}$ will be dropped, where no confusion will arise.

In determining $\epsilon_I$, note that a good first order approximation for the double-difference ionospheric group delay for the L2 pseudorange measurement is given in seconds by $$\Delta t_{group,L2} = -A/(f_{L2})^2. \quad (9)$$

The ionospheric group delay and phase delay have opposite signs because the ionosphere is a dispersive medium. The error term $\epsilon_I$ includes the ionospheric group delay and phase delay errors, viz.

$$\begin{aligned}\epsilon_I &= -(A/f_{L2})(f_\Delta/f_{L2}) - A(1/f_{L1} - 1/f_{L2}) \quad (10)\\ &= -A(f_{L1} - f_{L2})^2/[f_{L1}(f_{L2})^2].\end{aligned}$$

The advantage of this method is clear when the error $\epsilon_I$ is compared to the differential ionospheric phase delay error for the L1 carrier signal, $\epsilon_{I,L1}$, which is given in units of L1 cycles by $$\epsilon_{I,L1} = -A/f_{L1}. \quad (11)$$

$$\epsilon_{I,L1}/\epsilon_I = (f_{L2})^2/(f_{L1}-f_{L2})^2 \approx 12.46. \quad (12)$$

Equation (12) indicates the effective ionospheric error that results from the method used to estimate the DD integers $N_{i,i';j,j'}$, is lowered or attenuated by a factor of 12.46 relative to the differential ionospheric phase delay associated with the L1 carrier signal. This comparison emphasizes the improvement of the invention, as compared to the conventional approach in which only the L1 carrier and signal, or only the L2 carrier and signal, are used to determine position of the roving receiver. This improvement is highly desirable, as discussed below.

L2 pseudorange measurements can be substituted for L1 pseudorange measurements. Eqs. (2) and (3) remain unchanged. Equation (8) is modified, as shown below, to Eq. (13). The double-difference L1 pseudorange measurements are replaced by double difference L2 pseudorange measurements, referred to hereafter as L2 pseudorange measurements and determined in a manner analogous to Eq. (7). As before, each measurement of $\Delta\rho_{i,i';j,j';L1}$ corresponds to a measurement of $\phi_{\Delta i,i';j,j'}$ together with the associated DD integer $N_{i,i';j,j'}$.

The DD integers are now determined using the equation $$N_{i,i';j,j'} = \Delta\rho_{i,i';j,j';L1}/\lambda_\Delta + \phi_{\Delta i,i';j,j'}. \quad (13)$$

To derive an expression for $\epsilon_I$, note that the double-difference ionospheric group delay on the L1 pseudorange measurement is given in seconds by:

$$\Delta t_{group,L1} = -A/f_{L1}^2. \quad (14)$$

In the method used for resolving the DD integers $N_{i,i';j,j'}$ in which L1 pseudorange is utilized, the value of the error term $\epsilon_I$, expressed in units of wide-lane cycles, is given by $$\epsilon_I = A(f_{L1}-f_{L2})^2/[(f_{L1})^2 f_{L2}]. \quad (15)$$

The advantage of this method is once again clear when the error $\epsilon_I$ is compared to the differential ionospheric phase delay on the L1 signal, expressed in units of L1 cycles, as in Eq. (11). The ratio of the two error terms is $$\epsilon_{I,L1}/\epsilon_I = -f_{L1}f_{L2}/(f_{L1}-f_{L2})^2 = -15.99. \quad (16)$$

Equation (16) indicates the effective ionospheric attenuation that results from the method used to estimate the DD integers $N_{i,i';j,j'}$, as referenced to the differential ionospheric phase delay on the L1 signal. This attenuation is highly desirable, as explained later.

For both methods, the values referred to as the estimated DD integers $N_{i,i';j,j'}$ from either Eq. (7) or Eq. (13), are in fact real numbers with integer and fractional parts. The values of $N_{i,i';j,j'}$ can be used directly in Eq. (2) to yield three or more unambiguous simultaneous equations, viz.

$$\phi_{\Delta i,i';j,j'} = -\Delta R_{i,i';j,j'}/\lambda_\Delta + N_{i,i';j,j'}. \quad (17)$$

Here, the differential ionospheric delay term $\epsilon_I$ is very small and has been absorbed into the DD integer term $N_{i,i';j,j'}$ as an additional implicit error, and the quantities on the right hand side of Eq. (17) are now known or estimated with sufficient accuracy. If the value of the constant A, and thus the term $\epsilon_I$, is known or determinable, this term can be subtracted from the right hand side in Eq. (17), with a corresponding increase of accuracy in the DD integers and roving receiver position. The differential ionospheric term $-A(1/f_{L1} - 1/f_{L2})$ in Eq. (2) is assumed to be a small and unknown error term. If the value of A is known or determinable, this term can be added to the right hand side of Eq. (17), with a corresponding increase in accuracy of the roving receiver position. For the two receivers 13 and 14 and the four satellites 15, 17, 19 and 21 shown in FIG. 1, Eq. (1) may be rearranged in the form $$[(R_{i,j})^2]^{\frac{1}{2}} - [(R_{i',j})^2]^{\frac{1}{2}} = [(R_{i,j}^2)]^{\frac{1}{2}} - [(R_{i',j'})^2]^{\frac{1}{2}} + \quad (18)$$

$$\Delta[N_{i,i';j,j'} - \phi_{\Delta i,i';j,j'}](i = 15; i' = 17, 19, 21; j = 13; j' = 14),$$

$$(R_{i,j})^2 = (x_j - x_i)^2 + (y_j - y_i)^2 + (z_j - z_i)^2, \quad (19)$$

where $(x_j, y_j, z_j)$ and $(x_i, y_i, z_i)$ are the Cartesian coordinates of receiver number j and satellite number i, respectively, and the only unknowns in Eqs. (18) are the roving receiver coordinates $(x_j, y_j, z_j)$ (j=13). Where n satellites ($n \geq 4$) are used for the measurements of the theorange quantities in Eqs. (4)–(6), Eqs. (18) become n−1 simultaneous equations (n−1 $\geq$ 3) to be solved for the three roving receiver coordinates.

Eqs. (18) can be solved using various techniques to provide a best estimate of the differential position of the roving receiver 13 with respect to the reference receiver 14. For example, the technique of least squares, or a Kalman filter, or a square-root information filter can be employed. If n (>4) satellites are available, n−1 (>3) simultaneous equations can be formed. All of these can be used to determine the differential position, using one of the techniques mentioned, and the system of equations will be overdetermined. In general, the solution method will find an optimal value of the differential position of the roving receiver 13 that will result in values of $\Delta R_{i,i';j,j'}$ in Eq. (17) that minimize the errors in Eq. (17). In addition to the measurements made on the L1 and L2 carrier signals, an absolute position of the reference receiver 14 must be known with sufficient accuracy. If this position is unknown, it can be obtained using standard absolute positioning techniques which use either L1 or L2 non-differenced pseudoranges.

If the errors in the estimations of the DD integers $N_{i,i';j,j'}$ are no more than a small fraction of a wide-lane cycle, the fractional parts of such DD integers can be set equal to zero, with a corresponding improvement in the accuracy of the differential position determination. For example, these errors may be caused by phase multi-path errors, receiver systematic errors or ionospheric errors I. For this reason, the effective attenuation of the differential ionospheric phase delay related to the estimation of the DD integers and given above in Eqs. (12) and (16), is highly desirable.

The DD integers $N_{i,i';j,j'}$ can be described as stationary observables, and their values are independent of the motion of the satellites 15, 17, 19 and 21 and of the receivers 13 and 14. Provided that the signals from the satellites are tracked continuously without loss of signal lock, the theoretical values of the DD integers $N_{i,i';j,j'}$ are unchanged during these motions. This fact is exploited in the following improvement to the method to estimate the DD integers. Successive measurements from the satellites can be used to improve an estimate of the DD integers. Because the estimates of the DD integers are stationary, these estimates can be filtered using recursive filters, for example least squares or Kalman filters. The L1 and L2 carrier phase measurements and the L1 or L2 pseudorange measurements need not be filtered as must be done in the Hatch patent, U.S. Pat. No. 4,812,991, discussed above.

As additional measurements are received by the filter at successive measurement times, the quality of the estimates of the integers can be monitored by examining the fractional part of these estimates. Because sources of error with zero mean are attenuated by a noise filter, the fractional part of the estimates will decrease in magnitude. After many samples are taken, the fractional part of the DD integer estimate $N_{i,i';j,j'}$ can be set equal to zero, assuming that the magnitude of the errors in these estimates is less than a small fraction of a wide-lane cycle. When this is done, the accuracy of the differential position solution will no longer be affected by errors in the DD integer estimates.

The method for DD integer estimation does not require any initial delays or special initialization procedures. The calculations of differential positions can begin as soon as the necessary measurements are available, and information is available for calculation of satellite positions, and for calculation of a position of the reference receiver 14 with sufficient accuracy, if this is unknown.

If the P-code transmitted on the L2 carrier signal is encrypted into Y-code, the method of processing signals to resolve the wide-lane DD integers can be modified. One approach is to cross-correlate the L1 and L2 signals. This method assumes that the L1 and L2 Y-codes are identical. The cross-correlation process allows extraction of measurements of the difference between the L1 and L2 Y-code pseudoranges. The process also allows measurements of full-cycle L2 carrier phase. This is because the Y-code is removed from the L2 signal when the L1 and L2 signals are cross-correlated, and an L2 phase measurement can then be made in a similar manner as in the non-encrypted situation. Because measurements of L1 pseudoranges $\rho_{i,j;L1}$ can be made using the L1 C/A-code, a measurement of L2 pseudorange can be obtained using the relation $$\rho_{i,j;L2} = \rho_{i,j;L1} - c\Delta t_{12} \quad (20A)$$

Here the time parameter $\Delta_{12}$ is determined as follows. The satellite-transmitted signals $F_1(t)$ and $F_2(t)$, with respective carrier frequencies $f_{L1}$ and $f_{L2}$, are received at two input terminals of the roving receiver 13, as shown in FIG. 2A, and the correlation function $<F_1(t)F_2(t-\Delta t)> = C(\Delta t)$ is formed by use of a time delay module 37 and a signal product generator 38 in a conventional manner. The amplitude of $C(\Delta t)$ is examined by an amplitude analyzer 39, and the time delay $\Delta t$ is varied to obtain the maximum value of $C(\Delta t)$, denoted $C(\Delta t)_{max}$, which is obtained at a particular value of time delay, $\Delta t = \Delta t_{max}$, and $\Delta t_{12}$ is defined to be equal to $\Delta t_{max}$. The time delay quantity $\Delta t_{12}$ is approximately equal to the differential group delay of the transmitted signals with carrier frequencies $f_{L1}$ and $f_{L2}$. FIG. 2B illustrates apparatus analogous to FIG. 2A, but with a time delay module 37' used to process the L1 carrier signal rather than the L2 signal. In this latter situation, Eq. (20A) is replaced by the relation $$\rho_{i,j;L2} = \rho_{i,j;L1} + c\Delta t_{21}. \quad (20B)$$

Alternatively, only the L1 pseudorange measurements may be used. The double-differenced L1 or L2 pseudorange measurements can be used together with the double-differenced wide-lane phase measurements in a similar fashion to the original method. The wide-lane wavelength or lane width $\lambda\Delta$ is unchanged. The differential ionosperic phase delay effective attenuations are identical to the original method. This approach works with any PRN code and does not require that one of the codes (assumed identical except for carrier frequency) be encrypted.

Another approach for estimating the roving receiver position, when the P-code is encrypted into Y-code, is to square the L2 signal. The generation of the wide-lane phase is now achieved by differencing twice the L1 phase with the phase of the squared L2 signal. The new wide lane phase variable becomes $$\beta_{\Delta i,j} = 2\beta_{i,j;L1}^{(1)} - \beta_{i,j;L2}^{(2)} (i=15,17,19,21;j=13,14). \quad (21)$$

The respective carrier frequencies for this situation become $f_{L1'} = 2f_{L1}$ and $f_{L2'} = 2f_{L2}$, and the resulting wide-lane wavelength is halved as compared to the original situation. The wide-lane DD integers $N_{i,i';j,j'}$ are estimated using the new wide-lane phase measurements and L1 pseudorange measurements (using L1 C/A-code, because L1 P-code is assumed to be encrypted). The differential ionospheric phase delay factor $I$ given in Eq. (15) is effectively doubled, and the ratio $\epsilon_I/\epsilon_{I,L1}$ in Eq. (16) is halved, to approximately 8.

The invention provides a method for accurate and rapid determination of differential positions between two or more stations receiving signals from a plurality of satellites without any constraint on the movement of any of the stations relative to each other. The additional complexity of the receivers, which are part of the apparatus required by the invention, is minimized by the requirement that only L1 or L2 pseudorange measurements, together with L1 and L2 carrier phase measurements, are utilized by the invention, which implies that the receivers need not receive both L1 P-code and L2 P-code signals.

The method of estimating wide-lane double difference (DD) integers, using L1 or L2 pseudorange measurements, results in an effective attenuation of the error on the estimated DD integers due to the differential ionospheric phase delay; when the error is expressed in units of wide-lane cycles and compared against the differential ionospheric phase delay on the L1 signal in unit of L1 cycles. This is highly desirable, as it allows the fractional part of the estimated DD integers to be set to zero, when the magnitude of the error is less than one-half a wide-lane cycle, at which time the accuracy of the differential position is no longer affected by errors in the DD integer estimation method.

Because a stationary observable is formed and maintained during successive measurements from the satellites, namely, the DD integers $N_{i,i';j,j'}$ in Eqs. (8) and (13), filtering of the DD integers to improve their accuracy as additional measurements become available is significantly simplified. Optimal or suboptimal recursive filters can be utilized. Measurement processing is also simplified because there is no direct benefit from pre-filtering the carrier phase or pseudorange measurements.

Because the method of differential positioning uses measurements obtained by double-differencing measurements between satellites and stations, the effects of the receivers' clocks and satellites' clocks cancel so that they do not need to be further considered in the differential positioning method.

If the P-code signal on L2 is encrypted into Y-code signal, the method can be adapted for this circumstance. A wide-lane phase can be obtained by either: (i) cross-correlating the L1 and L2 signals; or (ii) by squaring the L2 signal. In case (i), L1 pseudorange measurements can be utilized, or L2 pseudorange measurements can be indirectly derived and utilized by measuring the group delay offsets between the Y-codes received using the L1 and L2 carrier frequencies. In case (ii), L1 pseudorange measurements can be utilized (using the C/A-code signal, because the P-code signal was assumed to be encrypted), and the width of the wide-lane is halved.

The procedure for position determination, shown as a flow chart in FIG. 3, begins with measurement of the carrier phase for each of the carrier frequencies $f_{L1}$ and $f_{L2}$ for $n \geq 4$ satellites, such as 15, 17, 19 and 21 shown schematically in FIG. 1, at each of the reference receiver 14 and the roving receiver 13 (step 41 in FIG. 3). Choosing one of the satellites, say 15, as a base, the double difference wide-lane phase $\phi_{\Delta i, i';j,j'}$, theoranges $\Delta R_{i,i';j,j'}$ and pseudoranges $\Delta \rho_{i,i';j,j';Lk}$ ($i=1; i'=2, \ldots, n; j=1; j'=2; k=1$ or 2) are formed as in Eqs. (2-6) (step 43). Resolve the $n-1$ DD phase integers, using Eq. (8) or (13), for each of the non-base satellites (e.g., 17, 19, 21 in FIG. 1) and the reference and roving receivers 14 and 13, respectively (step 45). The DD integers will usually contain errors due to noise, in addition to the contribution of the differential ionospheric error terms $\epsilon_I$ that are absorbed in the DD integers, and the DD integers are therefore filtered using an arithmetic sum least squares filter to produce filtered DD integers $N_{i,i';j,j'}(f)$ defined by $$N_{i,i';j,j'}(f) = \left[ \sum_{r=1}^{Q} N_{i,i';j,j'}(t_r) \right] / Q. \tag{22}$$

where Q sample determinations or estimates of each DD integer are assumed to be taken at times $t=t_1, \ldots, t_Q$ (step 47). If the noise source is normally distributed, the noise variance contribution to $N_{i,i';j,j'}(f)$ will decrease at least as fast as $1/Q$ for sufficiently large Q, and the filtered DD integer value in Eq. (16) will approach the "true" DD integer value. The integer M is chosen so that the standard deviation for the noise is reduced to less than a first threshold value $f_1$, such as $f_1 = 0.05$ wide lane units. Based upon past experience, $Q=60-300$ samples is probably sufficient for a sample rate of 1 Hz.

Now examine the integer part $[N_{i,i';j,j'}(f)]$ and fractional part $<N_{i,i';j,j'}(f)> = N_{i,i';j,j'}(f) - [N_{i,i';j,j'}(f)]$ of each of the filtered DD integers (step 49). The integer part [w] of a real number w is the largest integer that is less than or equal to w. If the fractional part of a given filtered DD integer is less than a small second threshold amount $f_2$, such as $f_2=0.25$ ($0 \leq <N_{i,i';j,j'}(f)> < 1$), the fractional part of the DD integer can be dropped or ignored. If the fractional part is larger than a third threshold amount, such as $f_3 = 1 - f_2$, a fraction $f_3$ can be added to the DD integer so that the effective DD integer becomes $[N_{i,i';j,j'}(f)] + 1$. If the filtered DD integer $N_{i,i';j,j'}(f)$ is "close to" an integer M, the DD integer is thus replaced by that integer. The filtered DD integer $N_{i,i';j,j'}(f)$ can optionally be replaced by a modified filtered DD integer, such as $[N_{i,i';j,j'}(f)+0.5]$, which produces the integer that is closest to the number $N_{i,i';j,j'}$. Alternatively, if the fractional part $<N_{i,i';j,j'}(f)>$ is not close to 0 or close to 1, this fractional part of the filtered DD integer can be carried along and included in the filtered integer $N_{i,i';j,j'}(f)$ obtained from Eqs. (13) and (22), and the filtered integer remains unchanged.

Where n satellites are used for position determination ($n \geq 4$), $n-1$ simultaneous equations (19) are solved to obtain or estimate the coordinates $(x_{13}, y_{13}, z_{13})$ of the roving receiver, given that the coordinates $(x_{14}, y_{14}, z_{14})$ of the reference receiver are known (step 51). If $n=4$, the number of equations is precisely equal to the number of unknowns (the roving receiver coordinates), and in principle a unique solution of the equations (18) should be obtainable. In practice, the solution obtained for $n=4$ may be erroneous because of the presence of other noise and other error sources. If $n>4$, the system of equations (18) is overdetermined, and approximate equations must be sought, based upon some error criterion.

One such approach is to minimize the least squares error sum $$= \sum_{i=2}^{n} [\phi_{\Delta 1, i';j,j'} + \Delta R_{1, i';j,j'}/\lambda_\Delta - N_{1, i';j,j'}(f)]^2, \tag{23}$$

where the receiver numbers j and j' (e.g., $j=13$ and $j'=14$) are fixed. A second approach, which is statistically more efficient, is Kalman filtering. A third approach, somewhat more cumbersome but being more numerically stable, is use of square root information filtering. These three approaches are discussed by G. Bierman in *Factorization Methods for Discrete Sequential Estimation*, Academic Press, 1977, pp. 13–31 and 68–112, incorporated by reference herein.

I claim:

1. A method for determining the position of a radio signal receiver located on or above the Earth's surface, the method comprising the steps of:
   (1) providing a roving receiver whose position is to be determined at a sequence of predetermined times;
   (2) providing a reference receiver whose position is known with sufficient accuracy at the sequence of predetermined times;
   (3) providing a plurality of n satellites ($n \geq 4$), numbered $j=1,2, \ldots, n$, at predetermined heights above the Earth's surface, where each satellite transmits a predetermined signal at a predetermined sequence of times at each of two carrier frequencies $f=f_{L1}$ and $f=f_{L2}$;

(4) determining a plurality of n theoretical distance values $R_{1,1}, R_{2,1}, \ldots, R_{n,1}$ from each of the satellites to the roving receiver at the sequence of predetermined times, where each theoretical distance value is determined from a knowledge of the position of a satellite and an approximate knowledge of the position of the roving receiver;

(5) determining a plurality of n theoretical distance values $R_{1,2}, R_{2,2}, \ldots, R_{n,2}$ from each of the satellites to the reference receiver at the sequence of predetermined times, where each theoretical distance value is determined from a knowledge of the position of a satellite and of the position of the reference receiver, where the position of the reference receiver is known with sufficient accuracy at each of the predetermined sequence of times;

(6) forming theoretical range double difference values $\Delta R_{i,i';j,j'}$ ($i,i'=1,2$; $i=i'$; $j,j'=2,3,4$; $j=j'$), defined by the relations $$\Delta R_{i,i';j,j'} = (R_{i,j} - R_{i',j}) - (R_{i,j'} - R_{i',j'})$$

for the pair of satellites i and i' and the pair of receivers j and j';

(7) determining a characteristic wavelength $\lambda_\Delta = c/(f_{L1} - f_{L2})$, where c is the velocity of light;

(8) measuring first and second phase variables, denoted $\beta_{a,b;Lk}$ ($k=1$ and 2) from observations of the phase of a signal sent by transmitter number a and received by receiver number b ($a = i$ or $i'$; $b = j$ or $j'$) with carrier frequency $f=f_{Lk}$;

(9) forming a third phase variable $\beta_{\Delta a,b} = \beta_{a,b;L1} - \beta_{a,b;L2}$;

(10) forming a fourth phase variable $\phi_{\Delta i,i';j,j'}$ defined by the relations $$\phi_{\Delta i,i';j,j'} = (\beta_{\Delta i,j} - \beta_{\Delta i',j}) - (\beta_{\Delta i,j'} - \beta_{\Delta i',j'})$$

for the pair of satellites i and i' and the pair of receivers j and j';

(11) measuring a pseudorange $\rho_{a,b;Lk} = c(t^b - t_a)$, where $t_a$ is the uncorrected time a given signal is transmitted by satellite a, $t^b$ is the uncorrected time the given signal is received by receiver b, c is the speed of light, and the satellite transmits the given signal using the carrier frequency $f=f_{Lk}$ ($a=i,i'$; $b=j,j'$; $k=1$ or 2);

(12) forming unfiltered pseudorange double difference values $\Delta \rho_{i,i';j,j';Lk}$ defined by the relations $$\Delta \rho_{i,i';j,j';Lk} = (\rho_{i,j;Lk} - \rho_{i',j;Lk}) - (\rho_{i,j';Lk} - \rho_{i',j';Lk});$$

(13) determining a fifth phase variable $N_{i,i';j,j'}$ by the relations $$N_{i,i';j,j'} = \Delta \rho_{i,i';j,j';Lk}/\lambda_\Delta + \phi_{\Delta i,i';j,j'}$$

with $i=1$, $j=1$ and $j'=2$;

(14) determining the values of the $n-1$ fifth phase variables $N_{1,i';1,2}$ ($i'=2, \ldots, n$) for a sequence of samples determined at the predetermined sequence of times;

(15) filtering the sequence of samples of the fifth phase variables $N_{1,i';1,2}$ for each value of $i'=2, \ldots, n$ to determine a filtered fifth phase variable $N_{1,i';1,2}(f)$, in order to remove or minimize the effects of noise on the fifth phase variable; and

(16) solving the $n-1$ simultaneous equations given by $$\phi_{\Delta 1,i';1,2} = -\Delta R_{1,i';1,2}/\lambda_\Delta + N_{1,i';1,2}(f), (i'=2, \ldots, n)$$

to obtain position coordinates $(x_1, y_1, z_1)$ of the roving receiver when the coordinates $(x_2, y_2, z_2)$ of the reference receiver are known are known with sufficient accuracy.

2. The method of claim 1, further comprising the step of choosing said integer n equal to four.

3. The method of claim 1, further comprising the step of performing said step of filtering of said samples of said fourth phase variables by the method of least squares filtering.

4. The method of claim 1, further comprising the step of performing said step of filtering of said samples of said fourth phase variables by the method of Kalman filtering.

5. The method of claim 1, further comprising the step of choosing said carrier frequency for measurement of said pseudorange values $\rho_{a,b;Lk}$ as $f_{Lk} = f_{L1}$.

6. The method of claim 5, further comprising the step of determining at least one of said pseudorange values $\rho_{a,b;Lk}$ for $f_{Lk} = f_{L2}$ by the following sequence of steps:

receiving at said receiver number j a first signal $F_1(t)$ and a second signal $F_2(t)$ with the respective carrier signal frequencies $f=f_{L1}$ and $f=f_{L2}$, respectively, where these two signals are transmitted as identical signals by a satellite number a with the respective carrier signal frequencies $f=f_{L1}$ and $f=f_{L2}$;

forming a cross-correlation signal $<F_1(t-)F_2(t-\Delta t)> = C(\Delta t)$, and determining the value of $\Delta t$, denoted $\Delta t_{max}$, for which $C(\Delta t)$ achieves its maximum value; and determining said pseudorange value $\rho_{a,b;Lk}$ for $f_{Lk} = f_{L2}$ by the relation $\rho_{a,b;L2} = \rho_{a,b;L1} - c\Delta t_{max}$, where c is the speed of light.

7. The method of claim 6, further comprising the steps of:

encrypting said signals transmitted at said carrier frequencies $f=f_{L1}$ and $f=f_{L2}$; and transmitting a second signal at said carrier frequency $f=f_{L1}$ that is not encrypted, and for which said fourth and fifth phase variables and said pseudorange values $\rho_{a,b;L1}$ ($a=i,i'$; $b=j,j'$) can be determined for use in steps (10)–(16) of claim 1 using this second signal and said signals transmitted at carrier frequencies $f=f_{L1}$ and $f=f_{L2}$.

8. The method of claim 5, further comprising the step of determining at least one of said pseudorange values $\rho_{a,b;Lk}$ for $f_{Lk} = f_{L2}$ by the following sequence of steps:

receiving at said receiver number j a first signal $F_1(t)$ and a second signal $F_2(t)$ with the respective carrier signal frequencies $f=f_{L1}$ and $f=f_{L2}$, respectively, where these two signals are transmitted as identical signals by a satellite number a with the respective carrier signal frequencies $f=f_{L1}$ and $f=f_{L2}$;

forming a cross-correlation signal $<F_1(t-\Delta t)F_2(t)> = C(\Delta t)$, and determining the value of $\Delta t$, denoted $\Delta t_{max}$, for which $C(\Delta t)$ achieves its maximum value; and determining said pseudorange value $\rho_{a,b;Lk}$ for $f_{Lk} = f_{L2}$ by the relation $\rho_{a,b;L2} = \rho_{a,b;L1} + c\Delta t_{max}$, where c is the speed of light.

9. The method of claim 8, further comprising the steps of:

encrypting said signals transmitted at said carrier frequencies $f=f_{L1}$ and $f=f_{L2}$; and transmitting a second signal at said carrier frequency $f=f_{L1}$ that is not encrypted, and for which said fourth and fifth phase variables and said pseudorange values $\rho_{a,b;L1}$ (a=i,i'; b=j,j') can be determined for use in steps (10)–(16) of claim 1 using this second signal and said signals transmitted at carrier frequencies $f=f_{L1}$ and $f=f_{L2}$.

10. The method of claim 1, further comprising the step of choosing said carrier frequency $f=f_{Lk}$ for measurement of said pseudorange values $\rho_{a,b;Lk}$ as $f_{Lk}=f_{L2}$.

11. The method of claim 1, further comprising the step of replacing said filtered fifth phase variable $N_{i,i',j,j'}(f)$ by an integer $M_{i,i',j,j'}$ if the absolute value of the difference $|N_{i,i',j,j'}(f)-M_{i,i',j,j'}| \leq g$, where g is a predetermined positive fraction ($0 < g \leq 0.5$).

12. The method of claim 1, wherein said step of solving said $n-1$ simultaneous equations comprises the step of solving the $n-1$ equations $$[(R_{i,j})^2]^{\frac{1}{2}} - [(R_{i',j})^2]^{\frac{1}{2}} = [(R_{i,j'})^2]^{\frac{1}{2}} - [(R_{i',j'})^2]^{\frac{1}{2}} +$$

$$\lambda_\Delta [N_{i,i',j,j'} - \phi_{\Delta i,i',j,j'}] (i=1; i'=2,3,\ldots,n; j=1; j'=2).$$

13. A method for determining the position of a radio signal receiver located on or above the Earth's surface, the method comprising the steps of:

(1) providing a roving receiver whose position is to be determined at a sequence of predetermined times;

(2) providing a reference receiver whose position is known with sufficient accuracy at the sequence of m predetermined times;

(3) providing a plurality of n satellites ($n \geq 4$), numbered $j=1,2,\ldots,n$, at predetermined heights above the Earth's surface, where each satellite transmits a predetermined signal at a predetermined sequence of times at each of two carrier frequencies $f=f_{L1}$ and $f=f_{L2}$;

(4) determining a plurality of m theoretical distance values $R_{1,1}, R_{2,1}, \ldots, R_{m,1}$ from each of the satellites to the roving receiver at the sequence of predetermined times, where each theoretical distance value is determined from a knowledge of the position of a satellite and an approximate knowledge of the position of the roving receiver;

(5) determining a plurality of m theoretical distance values $R_{1,2}, R_{2,2}, \ldots, R_{n,2}$ from each of the satellites to the reference receiver at the sequence of predetermined times, where each theoretical distance value is determined from a knowledge of the position of a satellieteand of the position of the reference receiver, where the position of the reference receiver is known with sufficient accuracy at each of the predetermined sequence of times;

(6) forming theoretical range double difference values $\Delta R_{i,i',j,j'}$ (i,i'=1,2; i=i'; j,j'=2,3 4; j=j'), defined by the relations $$\Delta R_{i,i',j,j'} = (R_{i,j} - R_{i',j}) - (R_{i,j'} - R_{i',j'})$$

for the pair of satellites i and i' and the pair of receivers j and j';

(7) determining a characteristic wavelength $\lambda_\Delta = c/(f_{L1}-f_{L2})$, where c is the velocity of light;

(8) receiving at receiver b two signals $S_{a,b;Lk}$ transmitted from satellite a (a=i,i';b=j,j') with carrier frequency $f=f_{Lk}$ (k=1 and 2);

(9) forming the square of the received signal $S_{a,b;L2}$ and determining a phase variable, denoted $\beta_{a,b;L2}^{(2)}$, of this squared signal;

(10) determining a phase variable, denoted $\beta_{a,b;L1}^{(1)}$, of the signal $S_{a,b;L1}$;

(11) forming a third phase variable $\beta_{\Delta a,b} = 2\beta_{a,b;L1}^{(1)} - \beta_{a,b;L2}^{(2)}$;

(12) forming a fourth phase variable $\phi_{\Delta i,i',j,j'}$ defined by the relations $$\phi_{\Delta i,i',j,j'} = (\beta_{\Delta i,j} - \beta_{\Delta i',j}) - (\beta_{\Delta i,j'} - \beta_{\Delta i',j'})$$

for the pair of satellites i and i' and the pair of receivers j and j';

(13) measuring a pseudorange $\rho_{a,b;L1} = c(t^b - t_a)$, where $t_a$ is the uncorrected time a given signal is transmitted by satellite a, $t^b$ is the uncorrected time the given signal is received by receiver b, c is the speed of light, and the satellite transmits the given signal using the carrier frequency $f=f_{L1}$ (a=i,i'; b=j,j');

(14) forming unfiltered pseudorange double difference values $\Delta \rho_{i,i',j,j';L1}$ defined by the relations $$\Delta \rho_{i,i',j,j';L1} = (\rho_{i,j;L1} - \rho_{i',j;L1}) - (\rho_{i,j';L1} - \rho_{i',j';L1});$$

(15) determining a fifth phase variable $N_{i,i',j,j'}$ by the relations $$N_{i,i',j,j'} = \Delta \rho_{i,i',j,j';L1}/\lambda_{66} + \phi_{\Delta i,i',j,j'}$$

with i=1, j=1 and j'=2;

(16) determining the values of the $n-1$ fifth phase variables $N_{1,i';1,2}$ (i'=2, ..., n) for a sequence of samples determined at the predetermined sequence of times;

(17) filtering the sequence of samples of the fifth phase variables $N_{1,i';1,2}$ for each value of i'=2, ..., n to determine a filtered fifth phase variable $N_{1,i';1,2}(f)$, in order to remove or minimize the effects of noise on the fifth phase variable; and

(18) solving the $n-1$ simultaneous equations given by $$\phi_{\Delta 1,i';1,2} = -\Delta R_{1,i';1,2}/\lambda_\Delta + N_{1,i';1,2}(f), (i'=2,\ldots,n)$$

to obtain position coordinates $(x_1,y_1,z_1)$ of the roving receiver when the coordinates $(x_2,y_2,z_2)$ of the reference receiver are known with sufficient accuracy.

14. The method of claim 13, wherein said step of solving said $n-1$ simultaneous equations comprises the step of solving the $n-1$ equations $$[(R_{i,j})^2]^{\frac{1}{2}} - [(R_{i',j})^2]^{\frac{1}{2}} = [(R_{i,j'})^2]^{\frac{1}{2}} - [(R_{i',j'})^2]^{\frac{1}{2}} +$$

$$\lambda_\Delta [N_{i,i',j,j'} - \phi_{\Delta i,i',j,j'}] (i=1; i'=2,3,\ldots,n; j=1; j'=2).$$

15. The method of claim 13, further comprising the steps of:

encrypting said signals transmitted at said carrier frequencies $f=f_{L1}$ and $f=f_{L2}$; and transmitting a second signal at said carrier frequency $f=f_{L1}$ that is not encrypted, and for which said fourth and fifth phase variables and said pseudorange values $\rho_{a,b;L1}$ (a=i,i';b=j,j') can be determined for use in steps (12)–(18) of claim 13 using this second signal and said signals transmitted at carrier frequencies $f=f_{L1}$ and $f=f_{L2}$.

* * * * *